April 21, 1970    N. H. SCOTT    3,507,302
CONTROL SYSTEM
Filed Nov. 21, 1967
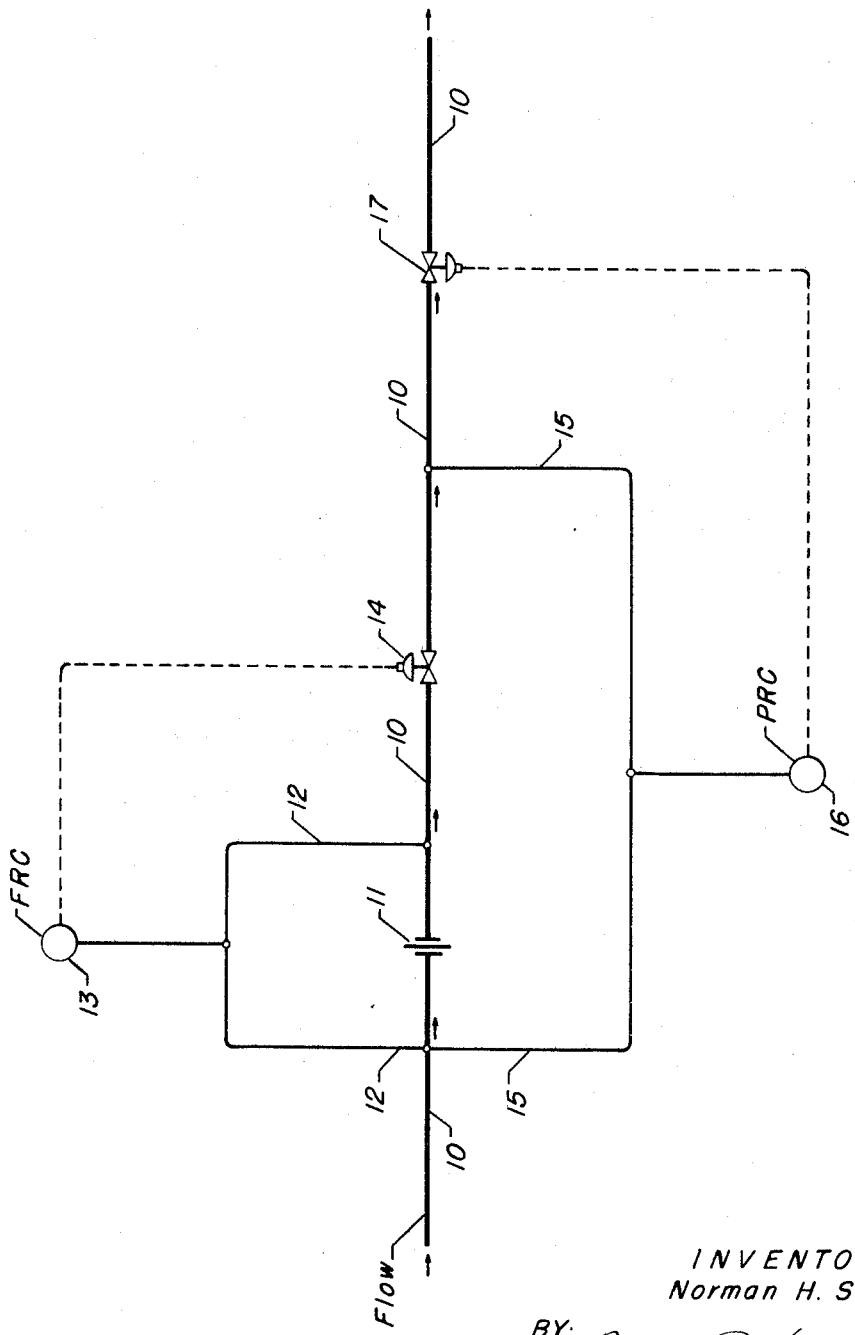
INVENTOR:
Norman H. Scott
BY: James R. Hoatson, Jr.
Joseph C. Mason, Jr.
ATTORNEYS

United States Patent Office 3,507,302
Patented Apr. 21, 1970

3,507,302
CONTROL SYSTEM
Norman H. Scott, Villa Park, Ill., assignor to Universal Oil Products Company, Des Plaines, Ill., a corporation of Delaware
Filed Nov. 21, 1967, Ser. No. 684,690
Int. Cl. F16k 31/12
U.S. Cl. 137—613      2 Claims

ABSTRACT OF THE DISCLOSURE

Control system for bringing a process pressure vessel on stream utilizing high pressure process gas. The system compries flow control means, such as an orifice and control valves, and pressure control means which is adapted to maintain a positive back pressure against both the orifice and control valve. The system is uniquely adaptable for use in a catalytic reforming system which utilizes an off-gas treater in periodic manner to remove impurities from the hydrogen recycle gas within the catalytic reforming circuit.

BACKGROUND OF THE INVENTION

The present invention relates to a control system. It specifically relates to a method and control system for starting up, or bringing on stream, a process pressure vessel. The control system particularly relates to the starting up of a process pressure vessel by controlling the flow of gas between a relatively high pressure process system and a relatively low pressure vessel.

It is known in the art that virtually all chemical and petroleum processing plants utilize the flow of gas and at least one operating pressure as critical variables in the control of such units. In recent years there has been a notable tendency to operate process units at increasingly higher pressures and within those units which utilize a catalyst, it is frequently desirable to recycle the off-gas back to the reaction zone for reuse. The recycle technique is particularly advantageous in hydrogenation and/or dehydrogenation chemical reactions. However, the recycle gas in many cases becomes contaminated with contaminants, such as sulfur compounds, which render the recycle gas objectionable for recycle purposes.

For the situation of contaminated gas which is desired to utilize for recycle purposes, those skilled in the art also frequently use treating means for removing the contaminants. In many cases, these treating facilities are operated periodically or in "swing" fashion which would alternate the treating facilities so that such facilities could be regenerated or revitalized for reuse in treating the gas stream.

For example, in catalytic reforming operations the recycle gas is generally maintained at relatively high pressure, e.g. from 200 to 700 p.s.i.g., and returned at such relatively high pressure to the catalytic reforming reaction zone. Thus, in the treatment of the recycle hydrogen gas stream for the removal, for example, of sulfur compounds, it was discovered that the entire reforming system was placed in an upset condition when the recycle gas was used to pressure-up the treater vessel in an abrupt manner. In other words, the removal of large quantities of recycle gas for the purpose of bringing on stream the recycle gas treater, would cause such a fluctuation in the rate of gas being returned to the catalytic zone that improper composition conditions prevailed which caused poor performance of the unit. Similarly, the use of the recycle process gas for starting up such a process pressure vessel would generally cause an abrupt drop in pressure of the system with the result that again the chemical process unit would be in an upset condition.

SUMMARY OF THE INVENTION

Accordingly, it is an object of this invention to provide a control system.

It is another object of this invention to provide an improved control system for use in starting up a process pressure vessel.

It is still another object of this invention to provide an improved method for starting up a process pressure vessel by controlling the flow of a gas between a relatively high pressure system and a relatively low pressure vessel.

Therefore, the control system of the present invention comprises flow control means consisting of orifice means cooperatively connected to control valve means and pressure control means adapted to maintain positive back pressure against both said orifice and said control valve means.

Another embodiment of the control system includes the system hereinabove further characterized by having relatively high pressure generating means connected upstream of said flow control means and relatively low pressure generating means downstream of said pressure control means.

Additionally, the present invention provides a method for starting up a process pressure vessel by controlling the flow of gas between a relatively high pressure system and a relatively low pressure vessel which comprises passing said gas at a relatively consistent rate from a relatively high pressure system into a relatively low pressure vessel, controlling said rate by rate responsive means, maintaining a predetermined back pressure against said rate responsive means, and discontinuing said rate control wherein said high pressure and said low pressure are substantially equal.

Thus, it is seen from the above embodiments that the control system of the present invention would bring on stream a pressure vessel at a slow, uniform rate. In other words, a graph of pressure with time for the relatively low pressure vessel would result in a substantially straight line to the point of pressure desired.

By contrast with conventional flow control schemes, a conventional control valve must be sized in order to control with the initial very high pressure drop present at the start of the period for bringing the process vessel on stream. As the pressure increases in the subject vessel, the flow control valve of the conventional system would eventually be wide open, thereby causing a decrease in flow as the pressure differential between the relatively high pressure system and the process vessel in the system approaches zero. Modifications can be made to a conventional flow control system by installing a back pressure regulator after the flow control valve. However, in practice, the prior art use of a back pressure regulator against the control valve results in a tendency of the controller to drift with the flow rate at substantially low flow rates or the flow will drift out of control as the pressure differential, previously mentioned, approaches zero.

Thus, it was discovered that the difficulties with the above mentioned prior art system could be overcome by the expedient of placing a positive back pressure against not only the flow control valve, but also against the orifice which is utilized to measure the flow rate. By operating in the manner taught by the present invention, the starting up of a process pressure vessel could be achieved at a uniform steady rate without causing upsets to the process system within which the invention is being utilized.

The invention may be more fully understood with reference to the accompanying drawing which is a schematic representation of one embodiment of the inventive control system.

DESCRIPTION OF THE DRAWING

Referring now to the drawing, a process gas stream, such as a hydrogen-containing gas from the high pressure separator of a catalytic reforming operation, is introduced into the inventive system via line 10 at a relatively high pressure. Orifice means 11, pressure tap means 12, flow recorder means (FRC) 13, and control valve 14 are utilized as flow control means on the gas flowing within conduit 10.

The inventive system also includes pressure lines 15, differential pressure recorder (PRC) 16, cooperatively connected to valve 17.

In operation for the start up of a process pressure vessel, such as a treating operation on the recycle hydrogen gas from a catalytic reforming operation, the gas passes through conduit 10 with FRC 13 being used to control the rate of flow of the gas in line 10 at a predetermined, relatively consistent rate. Control valve 17 being regulated by PRC 16 maintains a positive predetermined back pressure against valve 14 and orifice means 11. Generally, the degree of back pressure maintained by valve 17 can be varied widely depending upon the characteristics of the system being controlled, though preferbly, the back pressure is set close to the pressure at point 10. The passage of gas through conduit 10 is maintained until the pressure in the downstream side of valve 17 is substantailly the same as the upstream pressure from orifice 11. When the differential pressure between the relatively high pressure system and the relatively low pressure vessel are substantially equal, the flow in line 10 is discontinued and process flow through the pressure vessel is initiated, by means not shown.

As used herein and in the appended claims, the terms "high pressure generating means" and "low pressure generating means" is intended to embody broadly systems which are operating at the respective pressure. For example, a catalytic reforming process system defines a relatively high pressure generating means and a pressure vessel which is off stream and is being brought on stream from, say, atmospheric pressure to a relatively high pressure is maintained to define low pressure generating means.

The invention claimed:

1. In a flow control system for start-up of a process pressure vessel, flow regulating means comprising an orifice means, a pressure tap means spanning said orifice means having a flow controller means connected thereto, a first control valve downstream of said pressure tap means, a second control valve downstream of said first control valve, a differential pressure control means connected on one side upstream of said orifice means and on the other side intermediate said first and second control valves thereby to achieve process start-up at a substantially uniform rate.

2. System according to claim 1 further characterized by having relatively high pressure generating means connected upstream of said flow control means and relatively low pressure generating means downstream of said pressure control means.

References Cited

UNITED STATES PATENTS 3,255,161  6/1966  Cobb _____ 137—4 X

ALAN COHAN, Primary Examiner

U.S. Cl. X.R.

23—1, 288; 137—14, 501